US010323606B2

(12) United States Patent
Wilson et al.

(10) Patent No.: US 10,323,606 B2
(45) Date of Patent: Jun. 18, 2019

(54) CYCLONIC AIR-OIL SEPARATING FUEL COOLED OIL COOLER

(71) Applicants: Rolls-Royce North American Technologies, Inc., Indianapolis, IN (US); Rolls-Royce Corporation, Indianapolis, IN (US)

(72) Inventors: Eric E. Wilson, Mooresville, IN (US); Donald Klemen, Carmel, IN (US); Geoffrey L. Gatton, Brownsburg, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 185 days.

(21) Appl. No.: 14/853,757

(22) Filed: Sep. 14, 2015

(65) Prior Publication Data
US 2016/0076491 A1 Mar. 17, 2016

Related U.S. Application Data

(60) Provisional application No. 62/049,911, filed on Sep. 12, 2014.

(51) Int. Cl.
*B01D 19/00* (2006.01)
*F02M 25/08* (2006.01)
(Continued)

(52) U.S. Cl.
CPC ....... *F02M 25/089* (2013.01); *B01D 19/0057* (2013.01); *B01D 45/16* (2013.01); *F01M 1/10* (2013.01); *F16N 39/002* (2013.01); *B01D 29/15* (2013.01); *F01D 25/18* (2013.01); *Y02T 50/675* (2013.01)

(58) Field of Classification Search
CPC ........ F02M 25/089; F01M 1/10; B01D 29/15; B01D 45/16; B01D 19/0057; Y02T 50/675; Y02T 50/671; F01D 25/18; F16N 39/002
See application file for complete search history.

(56) References Cited

U.S. PATENT DOCUMENTS 2,695,679 A 11/1954 Hoffman et al.
3,302,397 A * 2/1967 Davidovic ................ F02C 7/08
415/115

(Continued)

FOREIGN PATENT DOCUMENTS

DE 102012010935 A1 12/2013
WO WO-8000368 A1 3/1980

OTHER PUBLICATIONS

European Search Report EP 15184235.8, dated Feb. 10, 2016.

*Primary Examiner* — Dung H Bui
(74) *Attorney, Agent, or Firm* — Fishman Stewart PLLC

(57) ABSTRACT

A vehicle includes an engine, an oil circuit for providing oil to the engine, a fuel supply line, and an air-oil separating unit. The air-oil separating unit is configured to receive aerated oil from the engine via the oil circuit, flow the aerated oil in approximately a helical direction to de-aerate the oil, receive fuel from the fuel supply line, cool the aerated oil with the fuel while the aerated oil flows in the approximately helical direction, causing the fuel to heat, and pass the cooled and de-aerated oil and pass the heated fuel to the engine.

16 Claims, 2 Drawing Sheets

(51) Int. Cl.
*F16N 39/00* (2006.01)
*B01D 45/16* (2006.01)
*F01M 1/10* (2006.01)
*B01D 29/15* (2006.01)
*F01D 25/18* (2006.01)

(56) References Cited

U.S. PATENT DOCUMENTS

| | | | |
|---|---|---|---|
| 3,327,456 A * | 6/1967 | Guber, Jr. | B04C 5/13 |
| | | | 165/101 |
| 3,449,891 A * | 6/1969 | Amelio | B64D 33/02 |
| | | | 244/53 B |
| 3,473,300 A * | 10/1969 | Jordan | B01D 45/12 |
| | | | 55/302 |
| 3,612,083 A | 10/1971 | Kronk | |
| 4,131,438 A | 12/1978 | Debrotnic | |
| 4,151,710 A | 5/1979 | Griffin et al. | |
| 4,328,006 A * | 5/1982 | Muenger | B01D 45/08 |
| | | | 122/5 |
| 4,328,008 A * | 5/1982 | Muenger | B01D 45/08 |
| | | | 252/373 |
| 4,344,479 A * | 8/1982 | Bailey | F22B 7/00 |
| | | | 122/155.2 |
| 5,116,394 A * | 5/1992 | Garkawe | B01D 45/12 |
| | | | 55/434.4 |
| 6,206,090 B1 | 3/2001 | Rago | |
| 6,502,630 B1 | 1/2003 | MacFarlane et al. | |
| 6,958,107 B1 * | 10/2005 | Clarke | B01D 3/08 |
| | | | 159/17.1 |
| 7,566,356 B2 | 7/2009 | Latulipe et al. | |
| 7,908,840 B2 | 3/2011 | Schwarz et al. | |
| 7,918,316 B2 | 4/2011 | Beier | |
| 7,993,425 B2 | 8/2011 | Corattiyil et al. | |
| 2009/0120296 A1 | 5/2009 | Saito | |
| 2009/0159246 A1 | 6/2009 | Cornet et al. | |
| 2010/0028127 A1 | 2/2010 | Cornet et al. | |
| 2013/0091812 A1 * | 4/2013 | Smith | A47L 5/22 |
| | | | 55/342.2 |
| 2013/0097990 A1 | 4/2013 | Cournoyer et al. | |

\* cited by examiner

CYCLONIC AIR-OIL SEPARATING FUEL COOLED OIL COOLER

CROSS-REFERENCE TO RELATED APPLICATIONS

This application claims priority to U.S. Provisional Patent Application No. 62/049,911, filed Sep. 12, 2014, the contents of which are hereby incorporated in their entirety

FIELD OF TECHNOLOGY

The present disclosure pertains to an air-oil separating system, and more particularly to a cyclonic air-oil separating fuel cooled oil cooler.

BACKGROUND

It has become increasingly helpful to improve air-oil separating systems in aerospace applications. Typically, oil is used as a lubricant that is circulated throughout an engine. Oil is pumped through supply lines to the engine. The process heats the oil and as such, typically an oil cooler is used in the circuit as well to properly maintain its working temperature.

The process also typically results in aeration of the oil, causing the oil to take on air which can compromise the oil lubricating properties as well as the ability for the oil to transfer heat. As such the oil may remain hotter than desired, which can cause increased engine wear both due to the increased temperature and the decreased lubricating ability.

As such, oil in such a circuit is commonly de-aerated in a de-aeration device, and then cooled using an oil cooler. However, aerospace applications typically have weight restrictions and it is desirable to minimize the amount of overall system mass for purposes of fuel efficiency. That is, two units having separate functionality are typically included in engine applications such as in an airplane, but each typically adds weight to the system, which can negatively impact fuel efficiency.

Overcoming these concerns would be helpful and it is therefore an object of the present disclosure to reduce overall component mass while providing both de-aeration and cooling of oil.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary vehicle includes an engine, an oil circuit for providing oil to the engine, a fuel supply line, and an air-oil separating unit. The air-oil separating unit is configured to receive aerated oil from the engine via the oil circuit, flow the aerated oil in approximately a helical direction to de-aerate the oil, receive fuel from the fuel supply line, cool the aerated oil with the fuel while the aerated oil flows in the approximately helical direction, causing the fuel to heat, and pass the cooled and de-aerated oil and pass the heated fuel to the engine.

More generally, an exemplary illustration includes a de-aeration system having an air-fluid separating unit that is configured to receive aerated fluid, flow the aerated fluid in approximately a helical direction to de-aerate the aerated fluid, receive a coolant, cool the aerated fluid with the coolant while the aerated fluid flows in the approximately helical direction, causing the fluid to heat, and pass the cooled and de-aerated fluid and pass the heated coolant from the air-fluid separating unit.

Correspondingly, a method of separating aerated fluid includes passing aerated fluid into a cyclonic air-separating heat exchanger to cause air to separate from the aerated fluid into a first stream of air and a second stream of de-aerated fluid, and passing a coolant into a jacket that surrounds the cyclonic air-separating heat exchanger, wherein the coolant is at a temperature that is lower than the aerated fluid, causing the coolant to warm and the fluid to cool while passing through the cyclonic air-separating heat exchanger.

Figure 1:
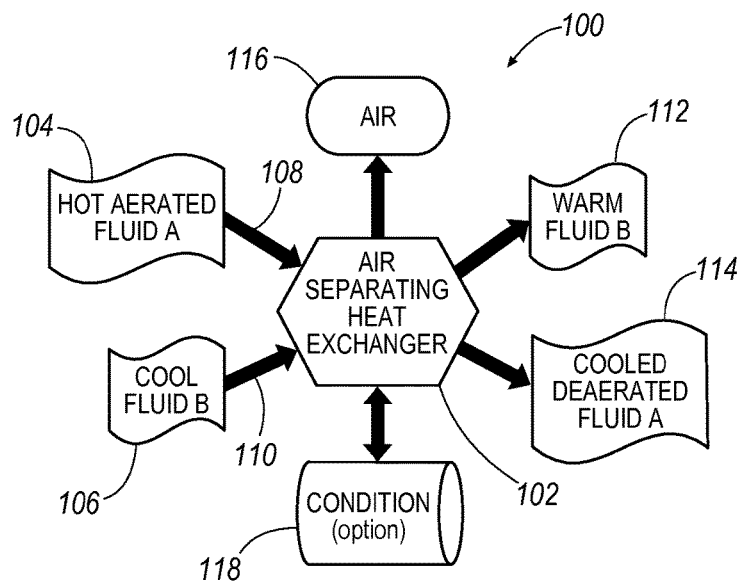
FIG. 1 illustrates a de-aeration system.

Referring now to the Figures, FIG. 1 illustrates a de-aeration system 100. System 100 includes an air-fluid separating unit 102. Air-fluid separating unit 102 is coupled to a hot aerated fluid supply 104, and a cool fluid supply 106 (hot and cold are defined relative to one another in this context). Air-fluid separating unit 102 is configured to receive aerated fluid 108, and also to receive a coolant 110 from cool fluid supply 106. Within air-fluid separating unit 102 is a cyclonic separation chamber that flows aerated fluid from hot aerated fluid supply 104 to air-fluid separating unit 102, causing air to separate from the aerated fluid and flow in an air stream that is separate from the outflowing/de-aerated fluid.

According to the principles of cyclonic separation, air is removed from aerated fluid though the use of vortex separation. Rotational effects and gravity are used to separate the air from the aerated fluid. A high speed rotating and helical flow, or approximately helical flow, is established within the cyclonic separation chamber. The inertia of the aerated fluid causes the fluid to cyclonically rotate against the outer surface of the cyclonic separation chamber. The aerated fluid includes air (that is desired to be removed) that, due to its much lower density, tends toward the center of the cyclone where it can collect. Also, due to the density difference between the fluid and the air and due to gravity, the fluid tends to descend while the air tends to ascend, causing the air to separate from the aerated fluid. As such, the fluid that descends is de-aerated and the buoyant effect of the air within the fluid causes the air to ascend.

Returning to FIG. 1, air-fluid separating unit 102 is also a heat exchanger that exchanges heat between the received hot aerated fluid 108 and the received coolant 110. Thus, not only does de-aeration occur within air-fluid separating unit 102 due to cyclonic separation, but the heat exchange between the hot aerated fluid 108 and the received coolant 110 causes the aerated fluid to cool (during de-aeration) and causing the coolant to warm. As such, relatively warmed coolant exits 112 after the de-aeration process, and cooled de-aerated fluid exits after the cooling process. That is, the hot aerated fluid 104 passes into air-fluid separating unit 102 and is caused to flow in approximately a helical direction to de-aerate the aerated fluid. The air-fluid separating unit 102 receives coolant 106, and the aerated fluid is cooled with the coolant while the aerated fluid flows in the approximately helical direction, causing the fluid to heat during de-aeration. The cooled and de-aerated fluid and the heated coolant are passed from the air-fluid separating unit 102. Air 116 passes out the top of air-fluid separating unit 102.

In one example, air may be considered a waste by-product that is simply ejected from the system. However, in another example, instead of being considered a waste by-product, air 116 may be productively used, for instance, to balance system scavenge pump flowing air. In another example, an air-oil mix may be used for lubrication of, for instance, a high speed bearing system. Or, because of the heat removal during the heat exchange with the coolant, the air may be used as a cooling mist on high temperature components in a system. That is, the air itself may be saturated with mist of oil that can act as a convection heat transfer medium that, when impinged upon a warm or hot surface, may be caused to vaporize, causing very high convection coefficients.

In another example, fluid condition monitoring may be implemented with a condition monitor 118. Fluid condition monitoring, in one example, is where a qualitative measurement of debris and particle contaminants in the fluid can be done once the air has been removed. Such methods may include using magnetic chip detection or a conductive/capacitive filter mesh. Conditioning can be in the form of filtration as a loop to an output of de-aerated fluid 114 with pressure differential over a media for contamination monitoring with differential pressure sensors. Monitoring of heat transfer can be done in condition monitor 118 and used to monitor heat transfer efficiency. Further, the air may be measured as it relates to the de-aerated fluid 114 for an expected amount of pump cavitation in a known volume sump system or potential failure or impending failure of a scavenge pump system. Additionally, condition monitor 118 may monitor debris of the de-aerated fluid 114. Or, heat rejection may be determined by condition monitor 118 based on the temperature of the warmed coolant 112 with respect to inlet temperature of the hot aerated fluid 104 and the cool coolant 106, to monitor for impending failure of a system where heat is generated by friction in the aerated fluid, and particle separation may trigger a monitor of the system.

Figure 2:
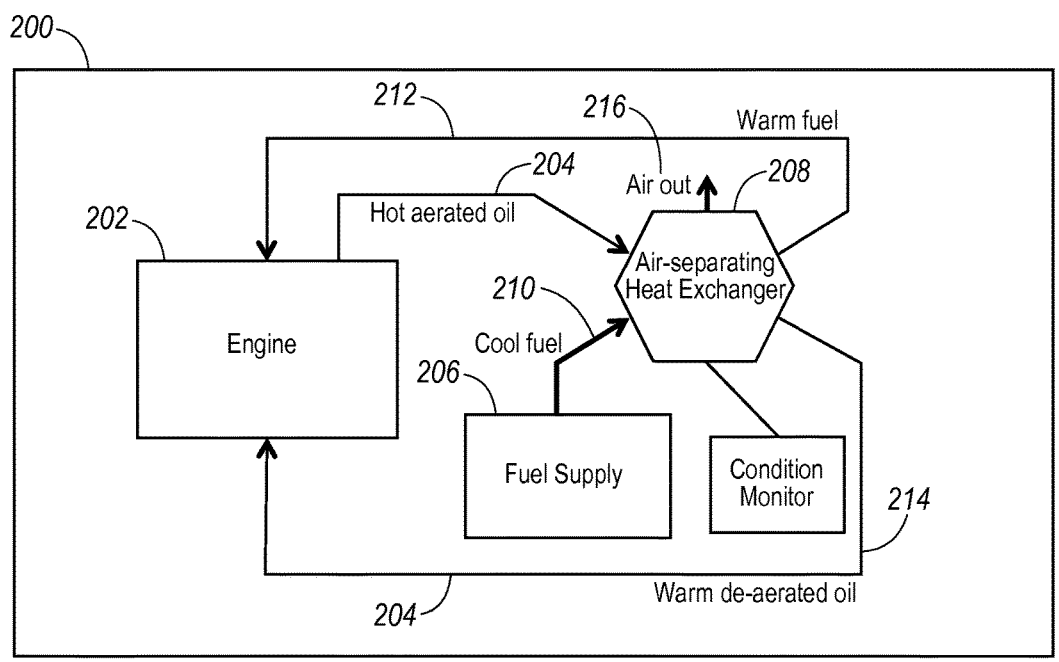
FIG. 2 is an exemplary vehicle having a de-aeration system.

Referring to FIG. 2, an exemplary vehicle 200, such as an aircraft, includes an engine 202, and an oil circuit 204 for providing oil to engine 202. Thus, in one example, engine 202 is a gas turbine engine for an aircraft. A liquid fuel supply 206 provides the relatively cool fuel to an air-separating heat exchanger 208 via a fuel supply line 210. Air-separating heat exchanger 208 is configured to receive aerated oil from the engine via the oil circuit, flow the aerated oil in approximately a helical direction and according to the principles of cyclonic separation. Heat exchange between the fuel and the hot aerated oil causes the fuel to warm and the oil to cool. As such, warm fuel passes along a first port or fuel supply line 212 to engine 202, and warm and de-aerated oil passes along a second port or oil supply line 214 to engine 202. That is, the hot aerated oil and the cool fuel supply flow into air-separating heat exchanger 208, de-aeration occurs, warmed fuel and cooled (i.e., warm as opposed to hot) oil pass to engine 202. Air is removed 216 and may be waste air, or may be used for other purposes as a by-product, as described.

Fuel from fuel supply 206 may include moisture that may negatively impact combustion performance within engine 202. Further, if the fuel is cold enough, the moisture contained within fuel may be frozen if the fuel is below the freezing point of water (i.e., 0° C. at ambient pressure). As such, it is typically desirable to heat the fuel at least above the melt point of water to eliminate any ice that may have formed therein, as well as to improve combustion thermodynamic efficiency. In one example, the fuel is raised 40° C. in temperature to above the melt point of water.

Figure 3:
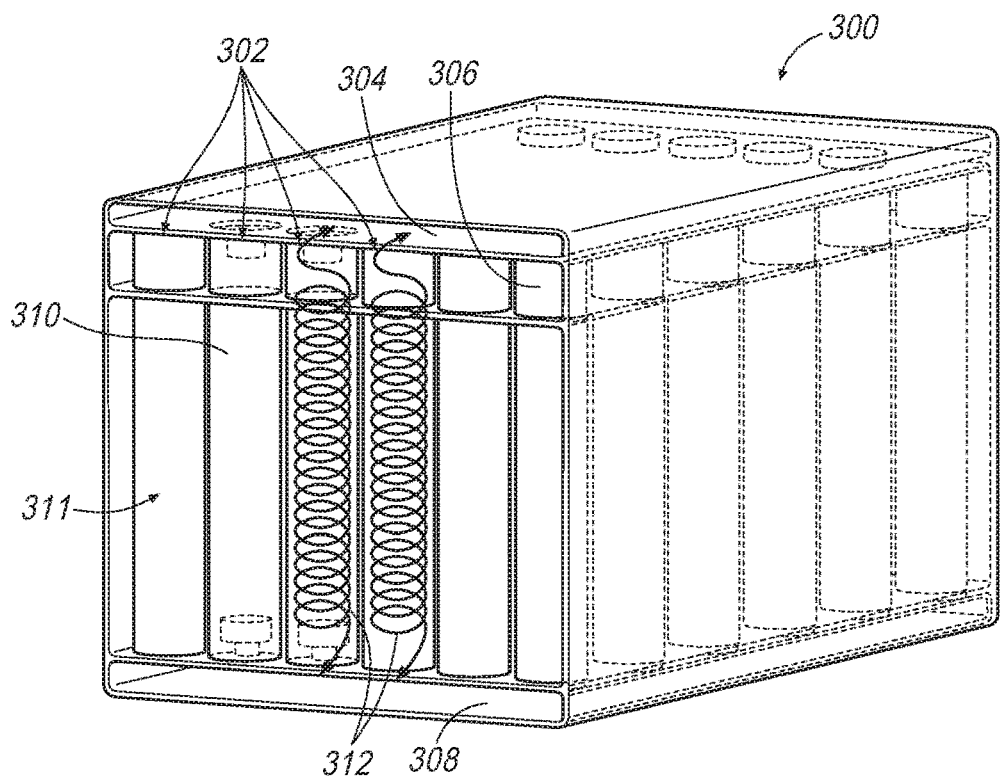
FIG. 3 illustrates an air-oil separating unit having a plurality of nested cyclonic separator chambers or cylinders.

Referring to FIG. 3, an air-oil separating unit 300 includes a plurality of nested cyclonic separator chambers or cylinders 302. Air-oil separating unit 300 includes an air-out chamber 304, an oil-in chamber 306, an oil-out chamber 308, and a fuel jacket pass-through chamber 310. According to the principles described, aerated oil flows into oil-in chamber 306, is caused to flow in approximately a helical direction 312, during which time de-aeration occurs. Air flows upward and into air-out chamber 304, and de-aerated oil flows downward to oil out chamber 308. Fuel also flows into fuel jacket pass-through chamber 310, causing the fuel to warm and the oil to cool during de-aeration. Thus, as shown, air-oil separating unit 300 includes a plurality of nested cylinders 302, each of which comprises a cyclonic separation chamber that flows the aerated oil in the approximately helical direction. A cooling jacket 311 is external to each cyclonic separation chamber that receives the fuel from a fuel supply line, and passes the heated fuel to an engine.

Figure 4:
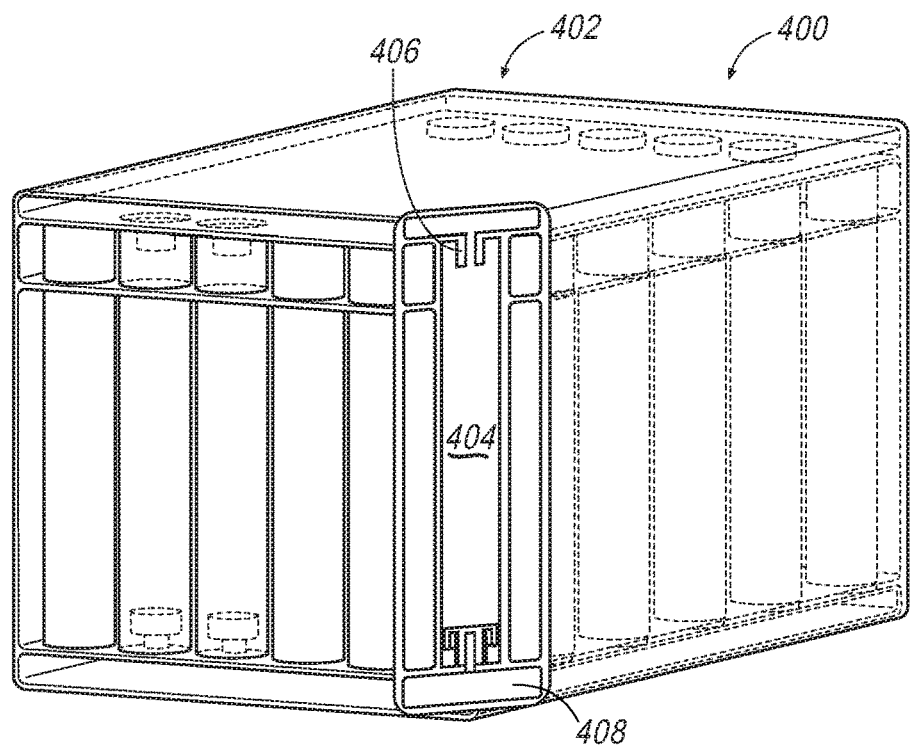
FIG. 4 illustrates an air-oil separating and heat exchanging unit having a corner cut-away for illustration purposes.

Referring to FIG. 4, an air-oil separating and heat exchanging unit 400 is shown having a corner cut-away 402, to illustrate internal features of one of one of the nested cyclonic separation chambers or cylinders 404, as described in FIG. 3. The illustrated cylinder 404 includes an air-out orifice 406, and a labyrinthine de-aerated oil-out port 408. That is, the cyclonic air-separating heat exchanger 400 includes a plurality of nested cylinders that includes passing different streams of the aerated fluid into each of the plurality of nested cylinders to cause the air to separate, and passing the coolant into the jacket that surrounds each of the plurality of nested cylinders.

The disclosed system is not limited to an aerospace or aircraft fuel cooled oil cooler and oil de-aerator. In one example, such as a helicopter application, aerated engine oil may be de-aerated, but instead of using a liquid fuel as a coolant, blast air may be used, or ram or induced bleed air may be used from an engine compressor.

Other applications may include a marine gas turbine or diesel engine where the coolant is cooling water, instead of fuel, and aerated engine oil is de-aerated. Another example may include an agricultural or industrial diesel engine where the coolant is engine coolant, and the engine oil is de-aerated. Another example may include industrial process equipment where the process requires a de-aeration of a fluid, and heat can be removed by a coolant or by a counter flow of warmed fluid that exits from the air-separating heat exchanger, which allows heating of a process fluid. Another example may include agricultural application of chemicals that have a tendency to foam or aerate when pumped, and could thus be reduced to a de-aerated flow while heating or cooling the process with inlet coolant or a counter-flow from another source of engine oil or coolant. Another example may be to prevent ventilation or cavitation of a pump when de-aerated fluid is used at an inlet of a pump system, and the system needs heat added to the fluid counter-flow by exiting fluid or removed by a coolant.

As such, this disclosure combines two separate units into one unit, providing both functions of de-aeration and heat exchange in a single process. That is, an air separator is combined with a liquid-liquid heat exchanger. The design uses a plurality of small cyclone separator cylinders to separate air and oil, while the cylinders are jacketed by fuel flow to exchange heat to the fuel. More generally, the disclosed device and method applies to any two liquids where one aerated liquid is de-aerated and the heat is exchanged to the other liquid.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A de-aeration system comprising:
   an air-fluid separating unit including:
      a plurality of cyclonic separation chambers arranged in a plurality of rows;
      a cooling jacket external to the plurality of cyclonic separation chambers;
      an air-out chamber over the plurality of cyclonic separation chambers;
      a plurality of oil-in chambers in fluid communication with an oil circuit of an engine and connecting the air-out chamber with the plurality of cyclonic separation chambers; and
      an oil-out chamber below the plurality of cyclonic separation chambers and in fluid communication with the oil circuit of the engine,
   wherein the plurality of cyclonic separation chambers include an orifice extending downwardly into each of the plurality of cyclonic separation chambers and a labyrinthine port extending upwardly into each of the plurality of cyclonic separation chambers, and
   wherein the air-fluid separating unit is configured to:
      receive aerated fluid,
      flow, by the plurality of cyclonic separation chambers, the aerated fluid in a helical direction to de-aerate the aerated fluid,
      receive, by the cooling jacket, a coolant fuel from a coolant supply line,
      cool the aerated fluid with the coolant fuel while the aerated fluid flows in the helical direction, causing the coolant fuel to heat,
      pass the cooled and de-aerated fluid through the labyrinthine port, and
      pass, by the cooling jacket, the heated coolant fuel from the air-fluid separating unit; and
   a condition monitor to monitor a condition of the de-aerated fluid using one of a magnetic chip detector and a conductive or capacitive filter mesh.

2. The system of claim 1, wherein each of the plurality of cyclonic separation chambers comprises:
   a first port to pass the cooled and de-aerated fluid from the air-fluid separating unit; and
   a second port to pass the heated coolant fuel from the air-fluid separating unit.

3. The system of claim 1, wherein the aerated fluid is aerated engine oil.

4. The system of claim 1, wherein the air-oil separating unit is further configured to pass air separated from the aerated oil during de-aeration to one of a lubrication system and a cooling mist system.

5. The system of claim 1, wherein the coolant fuel from a fuel supply line for an engine.

6. The system of claim 5, wherein the coolant fuel is heated above a melt point of water.

7. The system of claim 1, further comprising a coolant water.

8. A de-aeration device comprising:
   an air-fluid separating unit including a plurality of cyclonic separation chambers arranged in a plurality of rows and a cooling jacket external to the cyclonic separation chambers, the air-fluid separating unit including an air-out chamber on a first end of the plurality of cyclonic separation chambers, a plurality of oil-in chambers connecting the air-out chamber with the plurality of cyclonic separation chambers, and an oil-out chamber on a second end of the plurality of cyclonic separation chambers, and the air-fluid separating unit being configured to:
      receive aerated fluid,
      flow, by the plurality of cyclonic separation chambers, the aerated fluid in a helical direction to de-aerate the aerated fluid,
      receive, by the cooling jacket, a coolant fuel from a coolant supply line,
      cool the aerated fluid with the coolant fuel while the aerated fluid flows in the helical direction, thereby causing the coolant fuel to heat,
      pass the cooled and de-aerated fluid through a labyrinthine port, and
      pass, by the cooling jacket, the heated coolant fuel from the air-fluid separating unit; and
   a condition monitor to monitor a condition of the de-aerated fluid using one of a magnetic chip detector and a conductive or capacitive filter mesh.

9. The de-aeration device of claim 8, wherein each of the plurality of cyclonic separation chambers comprises:
   a first port to pass the cooled and de-aerated fluid from the air-fluid separating unit; and
   a second port to pass the heated coolant fuel from the air-fluid separating unit.

10. The de-aeration device of claim 8, wherein the aerated fluid is aerated engine oil.

11. The de-aeration device of claim 8, wherein the air-oil separating unit is further configured to pass air separated from the aerated oil during de-aeration to one of a lubrication system and a cooling mist system.

12. The de-aeration device of claim 8, wherein the coolant fuel from a fuel supply line for an engine.

13. The de-aeration device of claim 12, wherein the fuel is caused to heat above a melt point of water.

14. The de-aeration device of claim 8, further comprising a coolant water.

15. A de-aeration system for an engine, comprising:
an air-fluid separating unit having:
a first layer including an air-out chamber configured to discharge air,
a second layer including a plurality of oil-in chambers configured to receive aerated oil from an oil circuit of the engine and pass air to the first layer,
a third layer including a cooling jacket external to a plurality of cyclonic separation chambers arranged in a plurality of rows and configured to pass the aerated oil in a downward, helical direction through the plurality of cyclonic separation chambers while air from the aerated oil flows upward to the second layer and coolant fuel passes through the cooling jacket and around the plurality of cyclonic separation chambers, thereby cooling and de-aerating the aerated oil and heating the coolant fuel, and
a fourth layer configured to receive the cooled and de-aerated oil from the third layer and return the cooled and de-aerated oil to the oil circuit of the engine; and
a condition monitor to monitor a condition of the de-aerated oil using one of a magnetic chip detector and a conductive or capacitive filter mesh.

16. The system of claim 15, wherein each of the plurality of cyclonic separation chambers comprises:
a first port to pass the cooled and de-aerated oil from the air-fluid separating unit; and
a second port to pass the heated coolant fuel from the air-fluid separating unit.

\* \* \* \* \*